(No Model.)
M. C. & J. M. ISOM.
HAY LOADER AND STACKER.
No. 356,316. Patented Jan. 18, 1887.
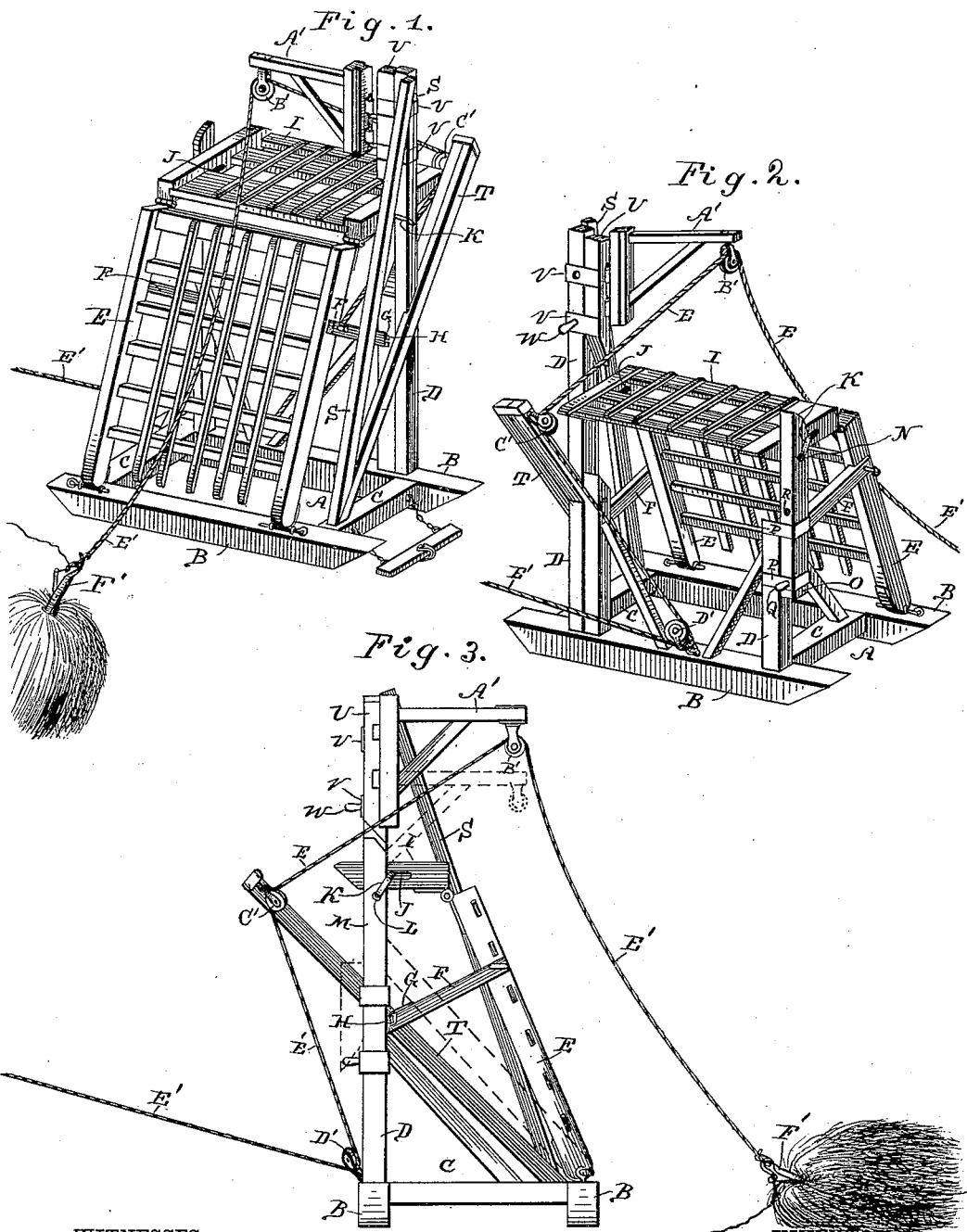
WITNESSES:
Thos. Houghton.
John C. Kemon
INVENTORS:
M. C. Isom
J. M. Isom
BY Munn & Co.
ATTORNEYS.

UNITED STATES PATENT OFFICE.

MARTIN C. ISOM AND JOHN M. ISOM, OF HOOSIER PRAIRIE, ILLINOIS.

HAY LOADER AND STACKER.

SPECIFICATION forming part of Letters Patent No. 356,316, dated January 18, 1887.

Application filed April 23, 1886. Serial No. 199,960. (No model.)

*To all whom it may concern:*

Be it known that we, MARTIN C. ISOM and JOHN M. ISOM, of Hoosier Prairie, in the county of Clay and State of Illinois, have invented a new and useful Improvement in Hay Loaders and Stackers, of which the following is a specification.

Our invention consists in the improved construction, arrangement, and combination of parts of a portable adjustable hay loader and stacker, as will be hereinafter fully described, and pointed out in the claims.

Referring to the accompanying drawings, Figure 1 is a perspective view of our improved hay loader and stacker. Fig. 2 is a perspective view taken from the other side, and Fig. 3 is an end elevation.

The same letters of reference indicate corresponding parts in all the figures.

Referring to the several parts by letter, A represents the carriage upon which the operative parts of the device are supported, the said carriage being constructed, as shown, with the runners B and connecting cross-pieces C in the form of a sled, by means of which construction the hay loader and stacker can be readily drawn by an ordinary team from place to place over the usual roads and fields. On one side of this carriage, near the ends thereof, are rigidly secured and braced the supporting-posts D, and to the other side of the carriage is hinged at its lower end the hay-ladder E, near the upper end of which are pivoted the ends of movable braces F, which are formed at their opposite and lower ends with the catches G, which fit into staples H on the sides of the supporting-posts D, thereby bracing and holding the hay-ladder in its operative position. To the upper end of the hay-ladder is hinged the adjustable platform I, the side pieces of which are formed with the apertures J, through which pass one leg of the U-shaped keys K, the other leg of one of these keys passing through a transverse aperture, L, in the crane-post M, while the other leg of the opposite key passes through a transverse aperture, N, near the upper end of a vertically-adjustable post, O, which slides in brackets P, secured to the side of one of the supporting-posts D, as shown, a pin, Q, passing through one of the said brackets into one of the transverse apertures R in the lower portion of the said sliding post.

M indicates the crane-post, the upper end of which is braced from the carriage by the removable brace S and the lower brace, T, and which carries near its upper end the vertically-adjustable hinge-block U, having the brackets V, which surround and slide upon the hinge-post, and through which passes the pin W, which secures the hinge-block in its adjusted position, the said block having hinged to its outer side the crane proper, A', at the outer end of the arm of which is swiveled the usual pulley, B', and through this pulley and two corresponding pulleys, C' and D', swiveled, respectively, to the outer projecting end of the brace T and the side of the carriage A, runs the rope E', which carries at its free forward end a hay-fork, F', of any suitable and desired construction, while to its rear end is applied the power, preferably horse-power, by which the hay-fork and its load of hay are elevated.

The operation of our improved hay loader and stacker is as follows: In starting a stack, the keys K and braces F may be removed and the slide-post O lowered to the sill or runner, when the hinged ladder can be lowered into the position shown in dotted lines in Fig. 3 of the drawings, and the crane proper may also be lowered on the crane-post as far as desired. When the stack has reached the proper height, the crane, the sliding post, and the hay-ladder with its platform are adjusted into their elevated position, as shown in full lines in the several figures of drawings. The fork F', after receiving its load of hay, is drawn up the inclined hay-ladder by the rope E', and is swung by the hinged crane exactly over the top of the stack, when the hay is released from the fork. In topping out a stack, the hay can be dropped on the platform and easily passed by a man or boy to the stacker. The non-adjustable portions of the device are secured together by bolts and nuts, so that they can be readily taken apart when it is desired to store the stacker away or in transporting it through woods or timber and packed upon the sled.

From the foregoing description, taken in connection with the accompanying drawings, the construction and operation of our improved portable adjustable hay loader and stacker will be readily understood. It will be seen that it is simple in construction and can be cheaply manufactured, while at the same time it is very efficient in its operation.

Having thus described our invention, what we claim, and desire to secure by Letters Patent, is—

1. The combination of the carriage consisting of the runners and the connecting cross-pieces, the crane-post carrying the swinging crane at its upper end, the inclined hay-ladder having the horizontal platform at its upper end, and the hoisting-rope passing through the pulleys and having a hay-fork of suitable construction at its forward free end, substantially as described.

2. The combination of the carriage consisting of the runners and the connecting cross-pieces, the crane-post carrying the swinging vertically-adjustable crane at its upper end, the supporting-posts one of which is provided with the brackets and the retaining-pin, the vertically-adjustable post sliding in the said brackets, the hay-ladder hinged at its lower end to the side of the carriage, adjustably connected to the supporting-posts by the removable braces, and having hinged to its upper end the movable platform, the keys for securing the said platform in its horizontal position, and the hoisting-rope passing through the pulleys and having a hay-fork of suitable construction at its forward free end, all constructed and arranged to operate in the manner and for the purpose herein shown and described.

MARTIN C. ISOM.
JOHN M. ISOM.

Witnesses:
WM. H. HUDELSON,
BEN HAGLE.